United States Patent
McKitterick et al.

(10) Patent No.: US 7,429,923 B2
(45) Date of Patent: Sep. 30, 2008

(54) NEURONAL SENSOR NETWORKS

(75) Inventors: John B. McKitterick, Columbia, MD (US); Richard A. Burne, Ellicott City, MD (US)

(73) Assignee: Honeywell International Inc., Morristown, NJ (US)

(*) Notice: Subject to any disclaimer, the term of this patent is extended or adjusted under 35 U.S.C. 154(b) by 264 days.

(21) Appl. No.: 10/970,933

(22) Filed: Oct. 22, 2004

(65) Prior Publication Data

US 2006/0097862 A1  May 11, 2006

(51) Int. Cl.
*G08B 13/00* (2006.01)
(52) U.S. Cl. .................. 340/541; 340/550; 340/565; 250/341
(58) Field of Classification Search .......... 340/540, 340/541, 545.4, 545.5, 550, 552, 561, 562, 340/565, 567, 949, 968; 250/341; 256/338.1; 119/708, 908
See application file for complete search history.

(56) References Cited

U.S. PATENT DOCUMENTS

| | | | | |
|---|---|---|---|---|
| 4,162,400 | A | * | 7/1979 | Pitts, Jr. ............... 340/854.7 |
| 4,888,581 | A | * | 12/1989 | Guscott ................. 340/666 |
| 5,117,359 | A | * | 5/1992 | Eccles .................... 702/3 |
| 5,276,770 | A | | 1/1994 | Castelaz |
| 5,633,989 | A | | 5/1997 | Shin et al. |
| 5,680,515 | A | | 10/1997 | Barhen et al. |
| 5,768,478 | A | | 6/1998 | Batten, Jr. |
| 5,895,460 | A | | 4/1999 | Gorelik |
| 5,939,987 | A | * | 8/1999 | Cram ................... 340/573.2 |
| 5,969,608 | A | * | 10/1999 | Sojdehei et al. ......... 340/551 |
| 6,515,586 | B1 | * | 2/2003 | Wymore ................ 340/541 |
| 6,598,459 | B1 | | 7/2003 | Fu |
| 6,643,627 | B2 | | 11/2003 | Liaw et al. |
| 7,154,391 | B2 | * | 12/2006 | Maki et al. ............. 340/550 |
| 7,301,334 | B2 | * | 11/2007 | Shen et al. ............ 324/207.26 |
| 2002/0177942 | A1 | | 11/2002 | Knaian et al. |
| 2003/0054333 | A1 | | 3/2003 | Hickman et al. |
| 2003/0056569 | A1 | | 3/2003 | Jansen |
| 2004/0012491 | A1 | * | 1/2004 | Kulesz et al. ........... 340/506 |
| 2004/0016287 | A1 | | 1/2004 | Fu |
| 2004/0069406 | A1 | | 4/2004 | Jan et al. |
| 2004/0130444 | A1 | * | 7/2004 | Pakhomov et al. ....... 340/522 |

FOREIGN PATENT DOCUMENTS

JP         4-127263         4/1992

OTHER PUBLICATIONS

Akyildiz et al., "A Survey on Sensor Networks", "IEEE Communications Magazine", Aug. 2002, pp. 102-114, vol. 40, No. 8, Publisher: IEEE, Published in: New York, NY.
Lucas et al., "Neural Network Clutter Filter for Large-Array Mosaic Sensors", Jun. 18, 1989, p. 607, Publisher: The Aerospace Corporation, Published in: El Segundo, CA.

* cited by examiner

*Primary Examiner*—Brent Swarthout
(74) *Attorney, Agent, or Firm*—McDonnell Boehnen Hulbert & Berghoff LLP

(57) ABSTRACT

A method for detecting significant events using neuronal sensor networks is provided. The method includes monitoring an environment surrounding a plurality of sensors for the presence of an event, when one or more events are detected, integrating the detected events over space and time using one or more collectors responsive to the plurality of sensors, determining when the one or more events are significant events and identifying and tracking significant events using processors responsive to the one or more collectors.

22 Claims, 5 Drawing Sheets

NEURONAL SENSOR NETWORKS

TECHNICAL FIELD

The present invention relates generally to the field of data communications, and in particular, to systems and methods of wide area sensor networks.

BACKGROUND

The use of sensor networks to detect, identify and track moving targets, particularly vehicles, is one that has been increasingly developed. Moving targets such as vehicles are often easy to identify due to the large seismic, magnetic or acoustic signals presented to the sensors that can easily distinguish them from the background noise. The effective range for sensors targeting moving vehicles as a result can be very large and thus only a few sensors are needed to cover a wide area. However, moving targets such as humans, horses or deer or the like provide signals that are often very small and difficult to distinguish from the surrounding background noise. Therefore, the effective range for sensors targeting humans, horses and deer can be very small.

Providing wide area sensor networks targeted for humans, horses and deer is currently problematic. To track targets that present small signals to the sensors requires a dense deployment of sensors to cover a wide area due to the limited range of each sensor. Each sensor must be small for reasons of cost and ease of deployment, and in some cases, the sensors need to be hidden from the targets. However, limiting the size of the sensors requires that the sensors provide the necessary communications to a processor unit at a low bandwidth and using a low amount of power.

For the reasons stated above, and for other reasons stated below which will become apparent to those skilled in the art upon reading and understanding the present specification, there is a need in the area of sensor networks for a low cost method of sensing moving targets such as humans, horses and deer or the like over a wide area using limited power and bandwidth.

SUMMARY

A system for detecting events using neuronal sensor networks is provided. The system includes a plurality of sensors that produce event detection signals when an event is detected and exceeds a minimum event threshold level, one or more collectors adapted to receive one or more of the event detection signals and produce threshold detection signals and one or more processors, adapted to receive threshold detection signals from the one or more collectors. The event detection signals use a simple communication protocol.

A method for detecting significant events using neuronal sensor networks is provided. The method includes monitoring an environment surrounding a plurality of sensors for the presence of an event, when one or more events are detected, integrating the detected events over space and time using one or more collectors responsive to the plurality of sensors, determining when the one or more events are significant events and identifying and tracking significant events using processors responsive to the one or more collectors.

A method for detecting events using neuronal sensors is provided. The method includes monitoring the surrounding environment for an event, determining whether the strength of the event exceeds the minimum event threshold level and transmitting an event detection signal to a collector when the strength of the event exceeds the minimum event threshold level.

A system for detecting events using neuronal sensor networks is provided. The system includes a plurality of sensors that produce and receive event detection signals when an event is detected, one or more collectors wherein each collector receives event detection signals from an associated subset of the plurality of sensors and produce threshold detection signals and one or more processors adapted to receive threshold detection signals from the one or more collectors. The event detection signals use a simple communication protocol.

DRAWINGS

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide systems and methods of wide area sensor networks. One example of an area to be covered is an area extending along a section of a trail or road, with the covered area extending several tens of meters to each side of the trail or road and extending several hundred meters along the road. Another example is the area surrounding an intersection of two roads or trails. In one or more embodiments, the present invention through the use of simple sensors provides low cost systems and methods for detecting moving targets such as humans, horses and deer over a wide area using limited power and bandwidth. The neuronal sensor network method allows a large number of simple sensors, densely deployed over a large area, to act as one sensor. Communication requirements for this method are minimized to simple ultra short-range detection transmissions. Also the signal processing occurs as a result of the method of communication, allowing basic integration over space and time.

In one embodiment, the sensors emit a signal only when it is stepped upon, using the energy provided by the stepping action (via piezoelectricity, for example). The detection range of this sensor is extremely short (the size of the foot), the signal it emits is simple ("ouch"), and it requires no energy source. With a sufficient density of these sensors, and appropriate collectors, the field of sensors could easily track a human across an area, and separate the passage of a human from the passage of a four-legged animal.

Figure 1:
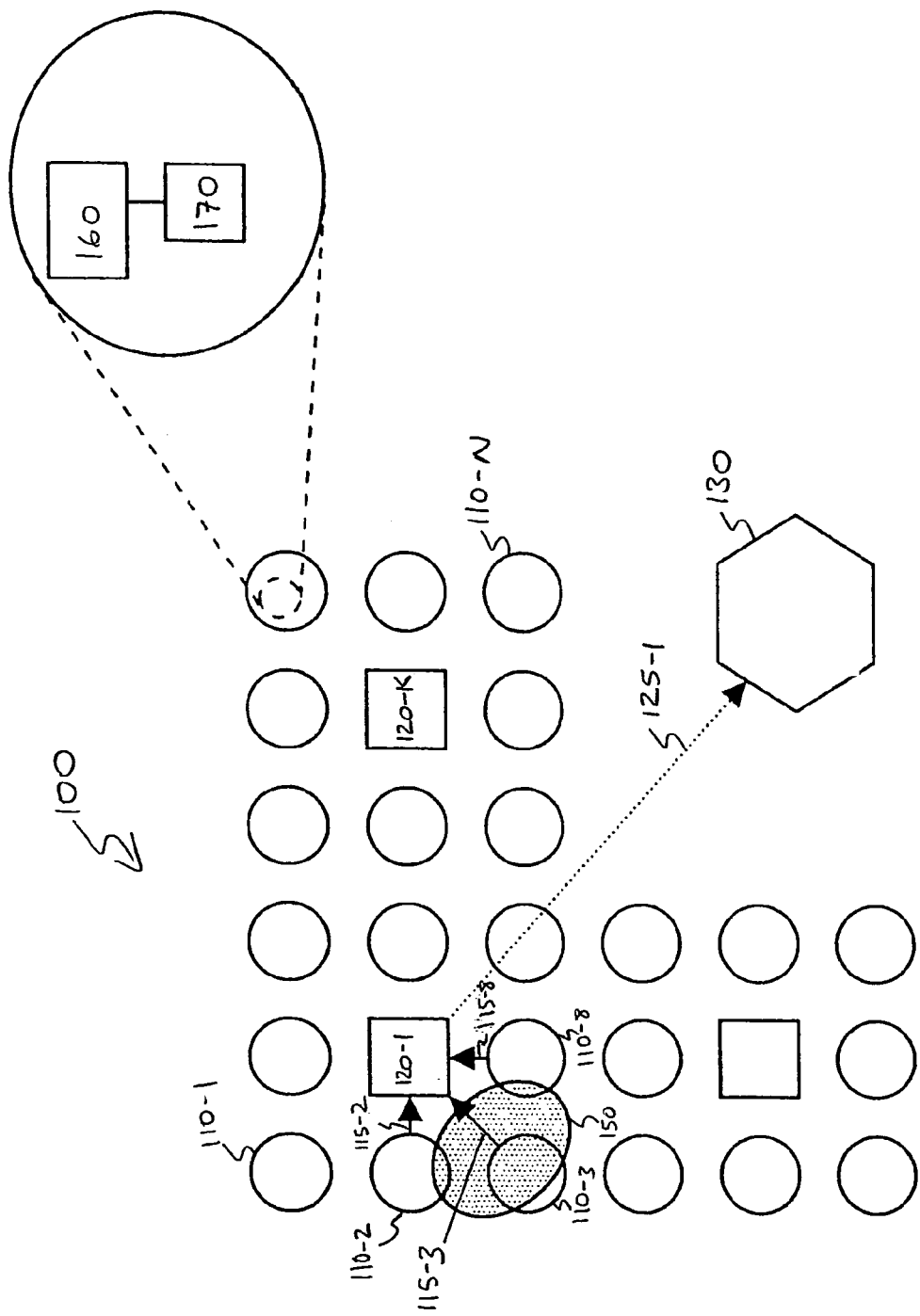
FIG. 1 is a diagram of one embodiment of a wide area sensor network 100 in accordance with the teachings of the present invention.

FIG. 1 is a diagram of one embodiment of a wide area sensor network 100 in accordance with the teachings of the present invention. Network 100 comprises a plurality of sensors 110-1 to 110-N. Sensors 110-1 to 110-N each comprise a simple ultra-short range transmitter 160 coupled to a controller 170. Also, each sensor of sensors 110-1 to 110-N is adapted to produce an event detection signal 115-1 to 115-N.

Network 100 also comprises one or more collectors 120-1 to 120-K that gather event detection signals 115-1 to 115-N from adjacent sensors that form an associated subset of sensors. Each collector of collectors 120-1 to 120-K is adapted to produce a threshold detection signal 125-1 to 125-K Lastly, network 100 also comprises a processor 130 that receives threshold detection signals 125-1 to 125-K from collectors 120-1 to 120-K. It will be appreciated by those skilled in the art, with the benefit of the present description, that the system can include one or more processors 130. However the description has been simplified to better understand the present invention. Also shown in FIG. 1 is an event 150 that triggers each sensor 110-2, 110-3 and 110-8 of sensors 110-1 to 110-N to send an event detection signal 115-2, 115-3 and 115-8, respectively, to controller 120-1. It will also be appreciated by those skilled in the art, that sensors 110-1 to 110-N can use a variety of sensing methods including seismic, magnetic, acoustic, and the like methods to detect an event such as event 150.

Network 100 allows a large number of sensors deployed in a wide area the ability to work as one sensor. In operation, sensors 110-1 to 110-N are scattered over a wide area with collectors 120-1 to 120-K in close proximity to each of its associated subset of neuronal sensor network sensors. Sensors 110-1 to 110-N monitor the surrounding area for any event that crosses a set minimum threshold level. To this end, sensors 110-1 to 110-N have two basic functions. The first function is that sensors 110-1 to 110-N have threshold detection capability. Threshold detection capability requires the sensor 110-1 to 110-N to identify when an event passes the minimum sensor threshold and to determine how far above the minimum sensor threshold the event exceeds. The second function of sensors 110-1 to 110-N is to send an event detection signal 115-1 to 115-N to a nearby collector 120-1 to 120-K when an event occurs. These event detection signals 115-1 to 115-N provide the nearby collector 120-1 to 120-K with the location of the event and the strength of the event above the sensor threshold level.

The implementation of collectors 120-1 to 120-K in close proximity to its associated subset of sensors allows sensors 110-1 to 110-N to be very basic, low cost devices. Sensors 110-1 to 110-N are only required to detect events using controller 160 and transmit ultra short-range event detection signals 115-1 to 115-N using transmitter 170 to a nearby collector 120-1 to 120-K. Also, the transmitted event detection signals 115-1 to 115-N only require a simple communication protocol. An example of one such communications protocol might be the transmission of a number of ultra-short pulses, with the number of pulses proportional to the strength of the detected event, in a manner analogous to the way a sensory cell transmits signals in a neuron. Another example of a simple communications protocol is to have each sensor simply transmit the event detection signal, relying on the use of short messages and short transmission ranges to avoid collisions between transmissions from different sensors. Thus, in one embodiment, sensors 110-1 to 110-N are very small and run on ultra low power. In some embodiments, sensors 110-1 to 110-N obtain, from its environment, sufficient power, such as solar power, to run without a battery. In addition to solar power, other possible methods of harvesting energy include thermal energy, barometric pressure changes, wind, or mechanical energy.

Network 100 provides an effective method for sensing moving targets such as humans, horses, deer and the like. As shown in FIG. 1, when event 150 is detected by one or more of sensors 110-2, 110-3 and 110-8, sensors 110-2, 110-3 and 110-8 immediately transmit event detection signals 115-2, 115-3 and 115-8, respectively to collector 120-1. As a result, collector 120-1 gathers event detection signals 115-2, 115-3 and 115-8 from sensors 110-2, 110-3 and 110-8 and transmits a threshold detection signal 125-1 to processor 130 indicating a significant event in the collector 120-1 area has occurred. Processor 130 uses threshold detection signal 125-1 to identify and track event 150.

Figure 2:
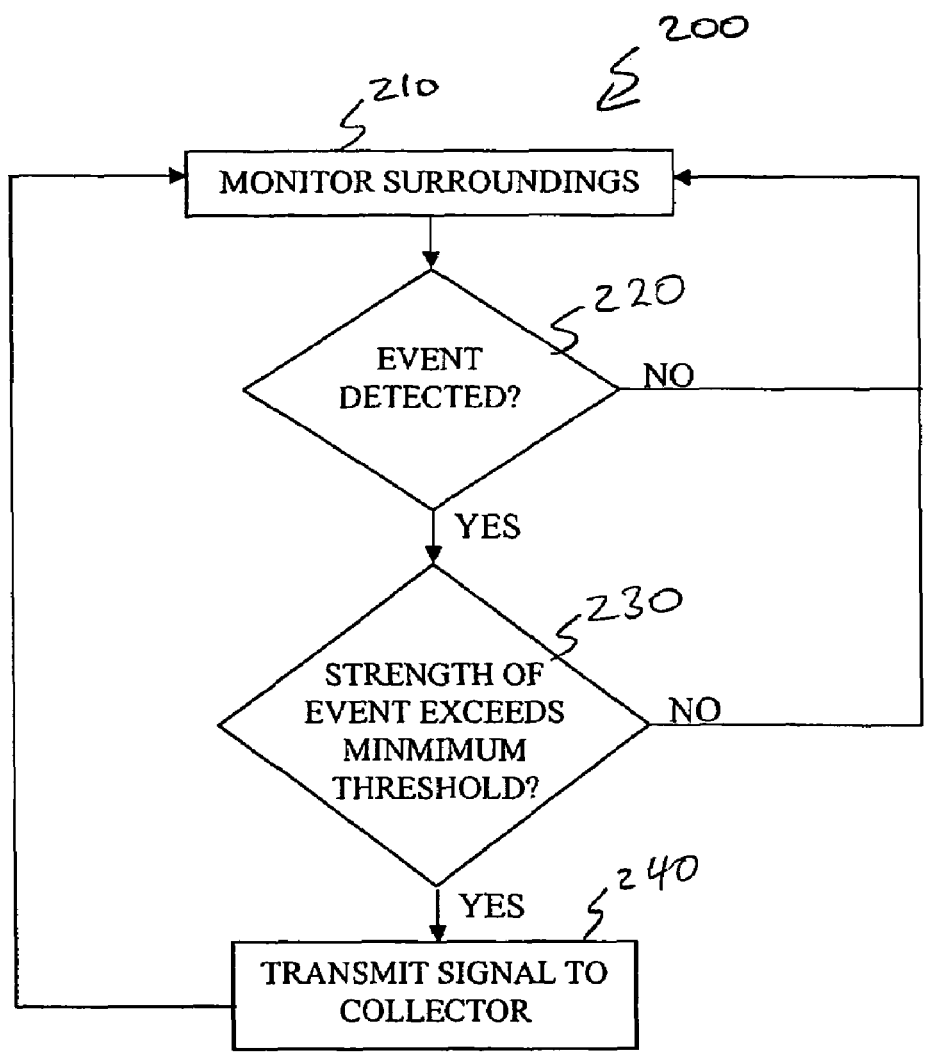
FIG. 2 is a flow chart that illustrates one embodiment of a method 200 for sensor event detection, according to the teachings of the present invention.

FIG. 2 is a flow chart that illustrates one embodiment of a method 200 for sensor event detection, according to the teachings of the present invention. Method 200 begins at block 210, where a sensor is continuously monitoring its surrounding area. At block 220 the sensor determines whether an event is detected. If no event is detected the sensor continues to monitor the surrounding area. However, if the sensor does detect an event, method 200 goes to block 230. At block 230 the sensor determines if the strength of the event surpasses the minimum threshold level. If the event does not surpass the minimum threshold level, method 200 goes back to block 210, where the sensor resumes monitoring the surround area for another event. If, however, the strength of the event does surpass the minimum threshold level, method 200 moves to block 240. At block 240 the sensor sends an event detection signal to a nearby collector. Once the sensor sends the event detection signal to the nearby collector, method 200 goes back to block 210, where the sensor resumes monitoring the surrounding area for an event.

Figure 3:
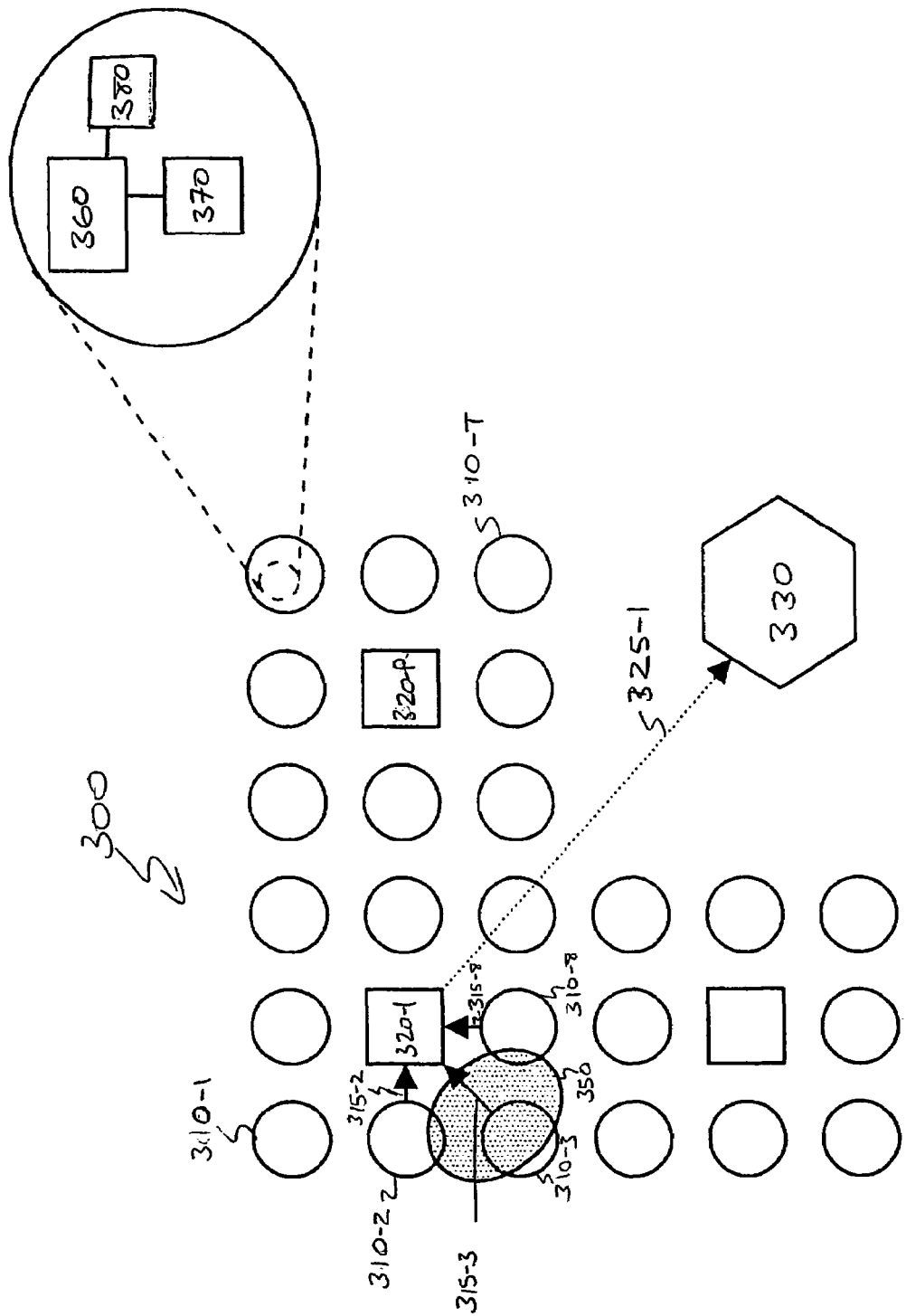
FIG. 3 is a diagram of another embodiment of a wide area sensor network 300 in accordance to the teachings of the present invention.

FIG. 3 is a diagram of another embodiment of a wide area sensor network 300 in accordance to the teachings of the present invention. Network 300 comprises a plurality of sensors 310-1 to 310-T. Sensors 310-1 to 310-T each comprise a simple ultra-short range transmitter 360 coupled to a controller 370 and a receiver 380 also coupled to controller 370. Also, each sensor of sensors 310-1 to 310-T is adapted to produce an event detection signal 315-1 to 315-T.

Network 300 also comprises one or more collectors 320-1 to 320-P that gather event detection signals 315-1 to 315-T from adjacent neuronal sensor network sensors that form an associated subset of sensors. Each collector of collectors 320-1 to 320-P is adapted to produce a threshold detection signal 325-1 to 325-P. Lastly, network 300 also comprises a processor 330 that receives threshold detection signals 325-1 to 325-P from collectors 320-1 to 320-P. It will be appreciated by those skilled in the art, with the benefit of the present description, that network 300 can include one or more processors 330. However the description has been simplified to better understand the present invention. Also shown in FIG. 3 is an event 350 that triggers sensors 310-2, 310-3 and 310-8 of sensors 310-1 to 310-T to each send an event detection signal 315-2, 315-3 and 315-8 to controller 320-1. It will also be appreciated by those skilled in the art, that sensors 310-1 to 310-T can use a variety of sensing methods including seismic, magnetic, acoustic sensing methods and the like to detect an event such as event 350.

Network 300 allows a large number of sensors deployed in a wide area the ability to work as one sensor. In operation, sensors 310-1 to 310-T are scattered over a wide area with collectors 320-1 to 320-P in close proximity to each sensor 310. Sensors 310-1 to 310-T monitor the surrounding area for any event that crosses a set minimum threshold level. To this end, sensors 310-1 to 310-T have three basic functions. The first function is that sensors 310-1 to 310-T have threshold detection capability. Threshold detection capability requires the sensor 310 to identify when an event passes the minimum sensor threshold and to determine how far above the sensor threshold the event exceeds. The second function of sensors 310-1 to 310-T is to send an event detection signal 315-1 to 315-T to a nearby collector of collectors 320-1 to 320-P as well as to nearby sensors of sensors 310-1 to 310-T when an event occurs. Lastly, sensors 310-1 to 310-T must have the ability to receive nearby event detection signals of event detection signals 315-1 to 315-T from nearby sensors of sensors 310-1 to 310-T. These event detection signals 315-1 to 315-T provide the collectors 320-1 to 320-P and nearby sensors of sensors 310-1 to 310-T with the location of the event and the strength of the event above the sensor threshold level.

The implementation of collectors 320-1 to 320-P in close proximity to each of its associated subset of sensors allows sensors 310-1 to 310-T to be very basic, low cost devices. As described above, sensors 310-1 to 310-T have only three tasks. First, sensors 310-1 to 310-T are required to detect events using controller 360. Sensors 310-1 to 310-T also transmit ultra short-range event detection signals 115-1 to 115-T using transmitter 370 to a nearby collector of collectors 320-1 to 320-P as well as to nearby sensors of sensors 310-1 to 310-T. Also, the transmitted event detection signals 115-1 to 115-T only require a simple communication protocol. Lastly, sensors 310-1 to 310-T receive ultra short-range transmissions using receiver 380 from nearby sensors of sensors 310-1 to 310-T. Thus, sensors 310-1 to 310-T can be very small and run on ultra low power. In some embodiments sensors 310-1 to 310-T can obtain from its environment sufficient power, such as solar power, to run without a battery.

Network 300 provides an effective method for sensing moving targets such as humans, horses and deer. As shown in FIG. 3, when event 350 is monitored by sensors 310-2, 310-3 and 310-8 of sensors 310-1 to 310-T, sensors 310-2, 310-3 and 310-8 immediately transmit event detection signals 315-2, 315-3 and 315-8 to collector 320-1 as well as to nearby sensors of sensors 310-1 to 310-T. As a result, collector 320-1 gathers event detection signals 315-2, 315-3 and 315-8 from sensors 310-2, 310-3 and 310-8 and transmits a threshold detection signal 325-1 to processor 330 indicating a significant event in the collector 320-1 area has occurred. Processor 330 can then use threshold detection signal 325-1 of threshold detection signals 325-1 to 325-P to identify and track event 350.

Figure 4:
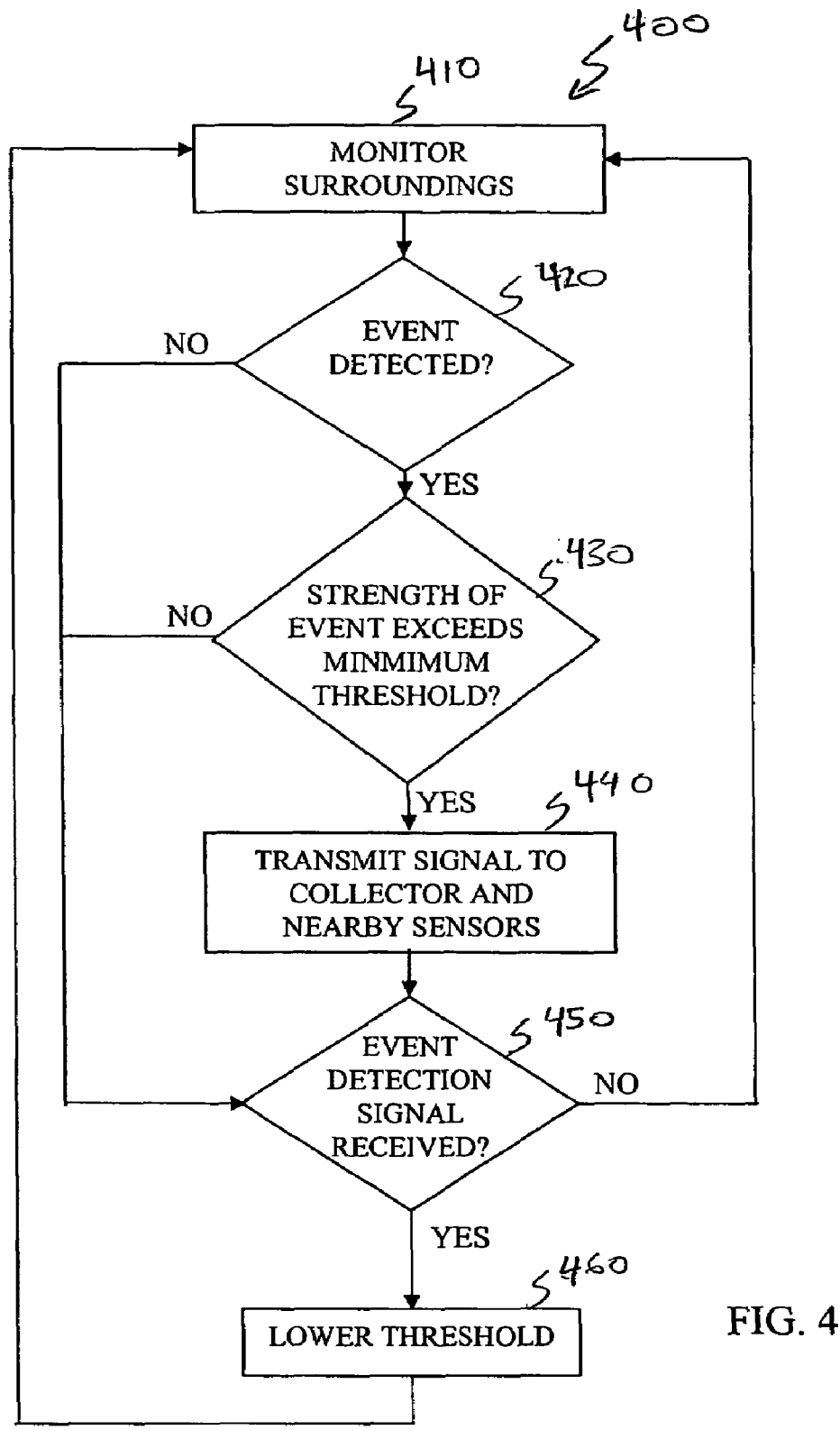
FIG. 4 is a flow chart that illustrates another embodiment of a method 400 for sensor event detection, according to the teachings of the present invention.

FIG. 4 is a flow chart that illustrates another embodiment of a method 400 for sensor event detection, according to the teachings of the present invention. Method 400 begins at block 410, where a sensor is continuously monitoring its surrounding area for an event. At block 420 the sensor determines whether an event is detected. If no event is detected the method goes back to block 410 and the sensor continues to monitor the surrounding area. However, if the sensor does detect an event, method 400 goes to block 430. At block 430 the sensor determines if the strength of the event surpasses the minimum threshold level. If the event does not surpass the minimum threshold level, method 400 moves to block 450. If, however, the strength of the event does surpass the minimum threshold level, method 400 moves to block 440.

At block 440 the sensor sends an event detection signal to the nearby collector and to other nearby sensors. When nearby sensors receive an event detection signal the nearby sensors will lower their minimum threshold level and continue to monitor its surroundings for an event. By lowering the minimum threshold level of nearby sensors when an event is detected allows the nearby collector to determine whether the event detected by the original sensor is a legitimate event or a random error. The method then moves on to block 450.

At block 450 the sensor checks to see if it has received any event detection signals from nearby sensors. If the sensor does not receive an event detection signal from a nearby sensor, method 400 goes back to block 410, where the sensor resumes monitoring the surrounding area for an event. If the sensor receives an event detection signal from a nearby sensor, method 400 goes to block 460. At block 460 the sensor will lower the minimum threshold level for a set amount of time (depending on the likely speed of the target and the sensor modality), after which method 400 goes back to block 410, where the sensor resumes monitoring the surrounding area for an event.

Figure 5:
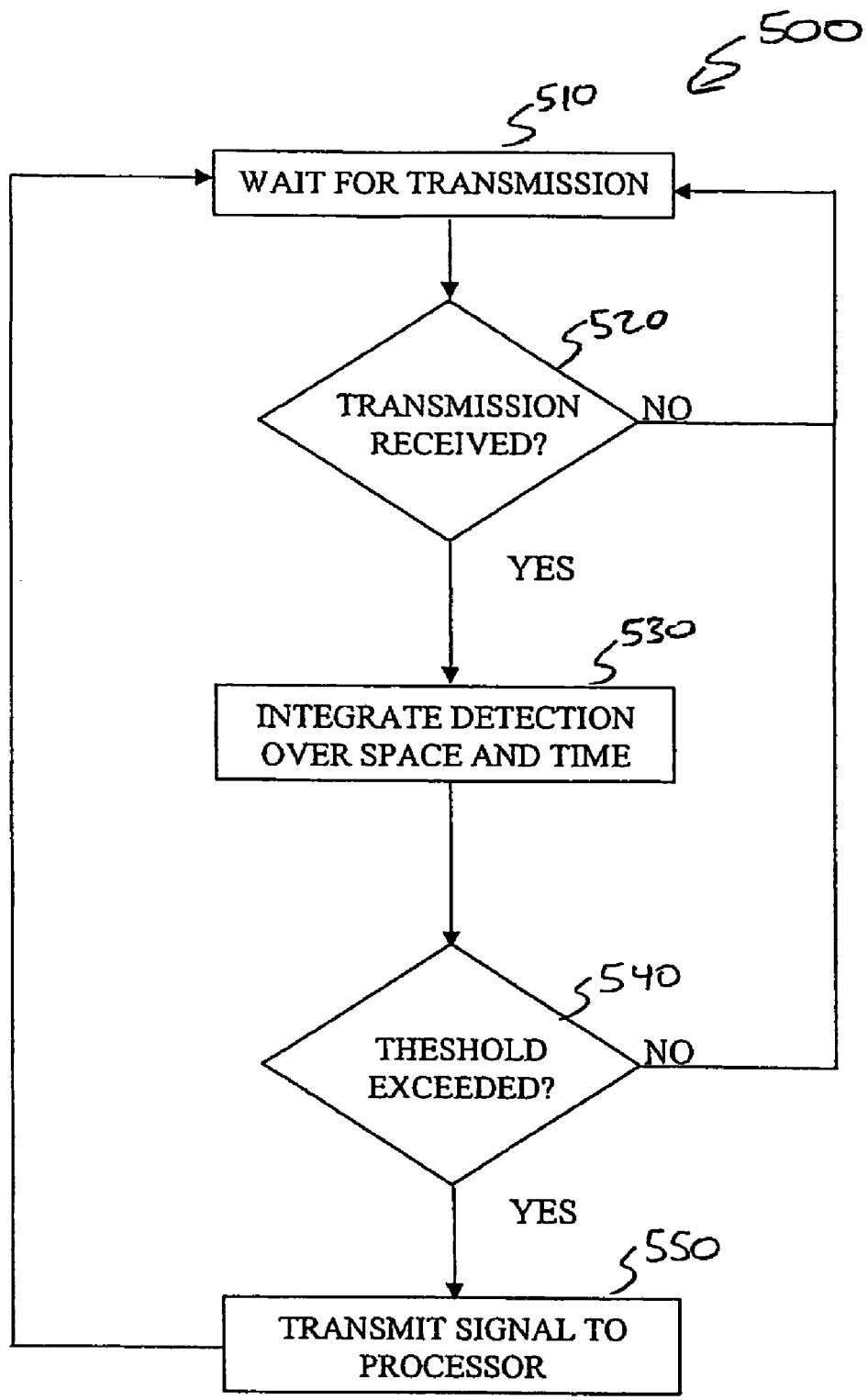
FIG. 5 is a flow chart that illustrates one embodiment of a method 500 for collector threshold detection according to the teachings of the present invention

FIG. 5 is a flow chart that illustrates one embodiment of a method 500 for collector threshold detection according to the teachings of the present invention. Method 500 begins at block 510, where a collector waits for event detection signals from nearby sensors. At block 520, method 500 checks to see if the collector has received an event-detection signal from a nearby sensor. If the collector has not received an event-detection signal from a nearby sensor, method 500 goes back to block 510, where the collector continues to wait for an event detection signal from nearby sensors. If the collector has received an event detection signal from a nearby sensor, method 500 goes to block 530.

At block 530 the collector integrates the event detection signal over space and time with any other event detection signals received by the collector and produces a stored summation. Method 500 then proceeds to block 540. At block 540 the collector determines whether the stored summation exceeds a predetermined collector threshold level. If the stored summation does not exceed the collector threshold level, method 500 goes back to block 510, where the collector continues to wait for event detection signals from nearby sensors. If the stored summation does exceed the collector threshold level, method 500 goes to block 550. At block 550 the collector transmits a threshold detection signal to a processor to determine whether a target, such as a human, horse or deer was detected. Method 500 then returns to block 510, where the collector continues to wait for event detection signals from nearby sensors.

What is claimed is:

1. A system for detecting events using neuronal sensor networks, the system comprising:
   a plurality of sensors that produce event detection signals when an event is detected and exceeds a minimum event threshold level, wherein each of the plurality of sensors comprises a respective controller that determines when an event exceeds a minimum event threshold level, and a respective transmitter that is coupled to the respective controller and that transmits the event detection signals according to a simple communication protocol, wherein each of the plurality of sensors has a source of power derived from the event;
   one or more collectors adapted to receive one or more of the event detection signals from an associated subset of the plurality of sensors that are in close proximity to the one or more collectors, wherein each of the one or more collectors integrates the received event detection signals transmitted from the associated subset of the plurality of sensors over space and time to produce a stored summation, wherein the one or more collectors produce a threshold detection signal when a predetermined collector threshold level is exceeded by the stored summation, and wherein each sensor of the plurality of sensors communicates directly with at least one collector; and one or more processors, adapted to receive threshold detection signals from the one or more collectors.

2. The system of claim 1, wherein the sensors are deployed over a wide area.

3. The system of claim 1, wherein each event detection signal provides the location of the event and strength of the event above a minimum event threshold level.

4. The system of claim 1, wherein each of the plurality of sensors runs on ultra low power.

5. The system of claim 1, wherein each of the one or more collectors transmits a threshold detection signal when a predetermined collector threshold level is exceeded by the stored summation.

6. The system of claim 1, wherein each of the one or more processors uses threshold detection signals to track and identify significant events.

7. A method for detecting significant events using neuronal sensor networks, the method comprising:

monitoring an environment surrounding a plurality of sensors for the presence of an event, wherein monitoring the environment surrounding a plurality of sensors for the presence of an event comprises (i) monitoring the surrounding environment for an event, (ii) determining whether the strength of the event exceeds a minimum event threshold level, and (iii) transmitting an event detection signal from one or more sensors to one or more associated collectors and nearby sensors, wherein each of the plurality of sensors has a source of power derived from the event, and wherein the event detection signals are ultra short-range detection transmissions;

when one or more events are detected, integrating the detected events over space and time to produce a stored summation using one or more collectors responsive to each collector's associated subset of the plurality of sensors that is in close proximity to the associated collector;

determining when the one or more events are significant events, wherein a significant event occurs when the stored summation exceeds the collector's minimum threshold level; and identifying and tracking significant events using one or more processors responsive to the one or more collectors.

8. The method of claim 7, wherein the sensor lowers its minimum event threshold level upon receiving an event detection signal from a nearby sensor.

9. The method of claim 8, wherein the sensor lowers its minimum event threshold level for a set period of time.

10. A system for detecting events using neuronal sensor networks, the system comprising:

a plurality of sensors that produce and receive event detection signals when an event is detected, wherein each of the plurality of sensors comprises a respective controller that detects when an event exceeds a minimum event threshold level, a respective transmitter that is coupled to the respective controller and that transmits the event detection signals according to a simple communication protocol, and a receiver that receives event detection signals transmitted by nearby sensors, and wherein each of the plurality of sensors has a source of power derived from the event;

one or more collectors wherein each collector receives event detection signals from an associated subset of the plurality of sensors that are in close proximity to the one or more collectors, wherein each of the one or more collectors integrates the received event detection signals transmitted from the associated subset of the plurality of sensors over space and time to produce a stored summation, wherein the one or more collectors produce a threshold detection signal when a predetermined collector threshold level is exceeded by the stored summation, and wherein each sensor of the plurality of sensors communicates directly with at least one collector; and one or more processors adapted to receive threshold detection signals from the one or more collectors.

11. The system of claim 10, wherein the plurality of sensors are deployed over a wide area.

12. The system of claim 10, wherein the event detection signal provides the location of the sensor event and the strength of the event above a minimum event threshold level.

13. The system of claim 10, wherein each of the plurality of sensors will lower its minimum event threshold level when it receives event detection signals from nearby sensors.

14. The system of claim 10, wherein each of the plurality of sensors runs on ultra low power.

15. The system of claim 10, wherein each of the plurality of sensors runs on power obtained from the environment.

16. The system of claim 10, wherein the detected event is a target stepping on one or more of the plurality of sensors.

17. The system of claim 10, wherein each of the one or more collectors transmits a threshold detection signal when a predetermined collector threshold level is exceeded by the stored summation.

18. The system of claim 10, wherein each of the one or more processors uses threshold detection signals to track and identify significant events.

19. A method for detecting events using neuronal sensors, the method comprising:

monitoring the surrounding environment for an event;

determining whether the strength of the event exceeds the minimum event threshold level; and transmitting an event detection signal from one or more sensors to one or more associated collectors and nearby sensors when the strength of the event exceeds the minimum event threshold level, wherein the event detection signal comprises a series of ultra-short pulses, and wherein the number of pulses in the series of ultra-short pulses corresponds to the strength of the event, wherein each of the plurality of sensors has an independent source of power and runs on ultra low power, and wherein a given sensor lowers its minimum event threshold level when it receives an event detection signal from a nearby sensor.

20. The method of claim 19, wherein the given sensor lowers its minimum event threshold level for a set period of time.

21. The system of claim 10, wherein each of the plurality of sensors will lower its minimum event threshold level for a set period of time when it receives event detection signals from nearby sensors.

22. The system of claim 1, wherein the detected event is a target stepping on one or more of the plurality of sensors.

* * * * *